United States Patent
Bryan et al.

(10) Patent No.: US 7,133,869 B2
(45) Date of Patent: Nov. 7, 2006

(54) METHODS AND SYSTEMS FOR AND DEFINING AND DISTRIBUTING INFORMATION ALERTS

(75) Inventors: Edward Lee Bryan, Durham, NC (US); David Tracy Bennett, Chapel Hill, NC (US); Richard Wayne Zobel, Jr., Raleigh, NC (US); Donald John Bell, Mebane, NC (US); Vincent Jacques Francois Guilbaud, Cary, NC (US)

(73) Assignee: Knowledge Vector, Inc., Durham, NC (US)

( * ) Notice: Subject to any disclaimer, the term of this patent is extended or adjusted under 35 U.S.C. 154(b) by 241 days.

(21) Appl. No.: 10/020,260

(22) Filed: Dec. 14, 2001

(65) Prior Publication Data

US 2002/0129354 A1    Sep. 12, 2002

Related U.S. Application Data

(63) Continuation-in-part of application No. 09/800,371, filed on Mar. 6, 2001.

(51) Int. Cl.
    *G06F 17/30* (2006.01)
(52) U.S. Cl. .............. 707/9; 707/1; 707/102; 707/104.1
(58) Field of Classification Search ........... 379/88.04, 379/88.17; 705/36; 707/1–10, 104.1; 709/200, 709/206
    See application file for complete search history.

(56) References Cited

U.S. PATENT DOCUMENTS

| | | | |
|---|---|---|---|
| 5,754,939 A | | 5/1998 | Herz et al. |
| 5,802,518 A | * | 9/1998 | Karaev et al. ............... 707/9 |
| 5,915,001 A | | 6/1999 | Uppaluru |
| 6,012,087 A | | 1/2000 | Freivald et al. |
| 6,047,327 A | | 4/2000 | Tso et al. |
| 6,049,796 A | | 4/2000 | Siitonen et al. |
| 6,061,718 A | | 5/2000 | Nelson |
| 6,157,924 A | | 12/2000 | Austin |
| 6,501,832 B1 | * | 12/2002 | Saylor et al. ............. 379/88.04 |
| 6,816,878 B1 | * | 11/2004 | Zimmers et al. ............ 709/200 |
| 2002/0184131 A1 | * | 12/2002 | Gatto ......................... 705/36 |
| 2003/0055897 A1 | * | 3/2003 | Brown et al. ............... 709/205 |

OTHER PUBLICATIONS

Nahm, "Speech Recognition Makes Using the Internet Easier Than Ever," Verbex Voice Systems, (Sep. 12, 1996).

(Continued)

*Primary Examiner*—Sam Rimell
*Assistant Examiner*—Mellissa M. Chojacki
(74) *Attorney, Agent, or Firm*—Jenkins, Wilson, Taylor & Hunt, P.A.

(57) ABSTRACT

Methods and systems for defining and distributing information alerts include presenting a user with a series of templates that allows the user to define security events, information alerts to be triggered by the events, and intended recipients for the alerts. Intended recipients for the alerts are presented with templates that allow the individuals to input contact and schedule information for receiving the information alerts. A knowledge switch uses the event definitions and the contact and schedule information to detect events and distribute the information alerts to the intended recipients when an event occurs. The information alerts include directives that instruct intended recipients regarding action to be taken in response to a security event.

43 Claims, 15 Drawing Sheets
(10 of 15 Drawing Sheet(s) Filed in Color)

OTHER PUBLICATIONS

Hemphill et al., "Surfing the Web by Voice," Multimedia, p. 215-222, (1995).

http://www.heyanita.com, Web Page Printout, (Believed to be no earlier than 2000).

http://www.zerocast.com, Web Page Printout, (Believed to be no earlier than 2000).

http://www.tellme.com, Web Page Printout, (Believed to be no earlier than 1999).

* cited by examiner

METHODS AND SYSTEMS FOR AND DEFINING AND DISTRIBUTING INFORMATION ALERTS

CROSS-REFERENCE TO RELATED APPLICATIONS

This application is a continuation-in-part of U.S. patent application Ser. No. 09/800,371, filed Mar. 6, 2001, the disclosure of which is incorporated herein by reference in its entirety.

BACKGROUND OF THE INVENTION

1. Field of the Invention

The present invention relates generally to methods and systems for creating, accessing and distributing information. More particularly, the present invention relates to a template-driven, distributed architecture for allowing individuals and groups to produce, distribute, and access information, including information alerts, over a multiplicity of communication pathways to a multiplicity of end user communication devices.

2. Related Art

In the first half of the twentieth century, the primary mechanisms for information distributors to distribute information to intended recipients were printed media, such as newspapers, and radio. In the second half of the twentieth century, television became the primary medium for distributing and accessing information. In the last decade of the twentieth century, a global computer network, commonly referred to as the Internet, became a widely used medium for distributing and accessing information. In the twenty-first century, wireless devices, such as mobile telephones and PDAs, have allowed individuals to access and distribute information via the Internet without requiring a fixed network connection. During all of this time, the fixed telephone network still remains the dominant mode by which individuals communicate information with other individuals.

Due to the increased mobility of today's society, individuals desire to access information from diverse sources anywhere and at any time. Such access is not possible using conventional information distribution media, such as radio and television, since programs are chosen by the broadcasters and only broadcast at times of day that are also selected by the broadcasters. In order to meet individuals' needs for ubiquitous information access, multi-modal information access systems have been developed. For example, the above-referenced parent application describes an end-user definable multi-modal information access system allows individuals to define unique per-user media portals in a multi-user system. Individuals are presented with a series of templates via a web interface that allow the individuals to input sources of information, keywords for searching the sources, and spoken keywords for accessing search results via a personal communications device, such as a mobile telephone. The end-user-definable, multi-modal information access system accesses the specified sources, retrieves the requested information, and delivers information to the individuals via their defined media portals. Thus, the system described in the parent application solves the problem of allowing individuals and groups of individuals to set up customized access to information anywhere at any time.

In addition to the need for ubiquitous information access, there also exists a need for ubiquitous information sharing and distribution. Information producers, such as news agencies, government agencies, companies, etc., often need to distribute information rapidly to many individuals. Conventional broadcast media, such as radio, television, or the Internet, may not be suitable for this purpose because there is no guarantee that the intended information recipients will be reached. Targeted communications mechanisms, such as the wireless and wireline telecommunications networks, like broadcast media, are also limited by the inability to guarantee that the intended recipients will receive information and the ability to acknowledge receipt of same.

One potential solution to the information distribution problem is to develop a customized system by which individuals in a particular organization are tracked, e.g., using a computerized scheduling system, wireless station tracking, and indigenous GPS, and the information is delivered to the individuals based on location information provided via the scheduling system. While such a system may be suitable for one organization, the system would require redesign for each organization in which it is implemented and there would be no mechanism for sharing information between organizations.

Accordingly, there exists a long-felt need for methods and systems for distributing and accessing information that avoid the difficulties associated with conventional communications media.

BRIEF SUMMARY OF THE INVENTION

The present invention includes a template-driven, distributed architecture for defining information events, defining information alerts associated with the events, and distributing the information alerts to intended recipients. The core of this architecture is referred to herein as a KNOWLEDGE SWITCH™. A KNOWLEDGE SWITCH™ includes hardware and software components configurable by templates to deliver and access information from any appropriate source and via any appropriately defined physical communications device. The KNOWLEDGE SWITCH™ includes a logic kernel that controls overall information access and distribution functions. A profiles module allows end users to define contact profiles and to associate the contact profiles with the end user's schedules. The profiles module also allows end users to define their own media portals, as described in the parent application. An input/output module sends and receives information via any type of communication device for which a device driver and suitable communication hardware have been defined. A content database stores content extracted from both public and private sources.

The components of the KNOWLEDGE SWITCH™ are end-user-configurable using a system of templates. As discussed extensively in the parent application, one type of template allows users to define their own media portals whereby information is extracted from a plurality of sources can be accessed via a variety of communications devices using user-defined spoken keywords. Another type of template that may be used to configure the KNOWLEDGE SWITCH™ includes an alert template that allows events, alert messages, and intended recipients to be defined. Still another type of template is a contact template that allows end users to define their contact information and to associate the contact information with their schedules. Yet another type of template that may be included is a producer template that allows an information producer to produce information and make it available to end users via the KNOWLEDGE SWITCH™. Additionally, the producer can act with the user template to make sure that authenticated content can be created and delivered in a fully integrated fashion. Yet another type of template allows end users to define their own media schedules so that the individuals can control the time and format in which the individuals receive content.

Accordingly, it is an object of the invention to provide methods and systems for distributing and accessing information that avoid the difficulties associated with conventional communications media.

It is another object of the invention to provide a template-driven architecture that allows users to configure an information access and distribution system to a particular user's needs.

It is yet another object of the invention to provide a distributed, modular architecture for an information access and distribution in which components can be upgraded or replaced without affecting other components.

It is yet another object of the invention to provide a system including multiple KNOWLEDGE SWITCHES™ wherein the KNOWLEDGE SWITCHES™ are individually configured to respond differently to different events through system-wide defined protocols and that are also configured to communicate with other KNOWLEDGE SWITCHES™ when such an event occurs.

It is yet another object of the invention to provide a method for authenticating end users to an information access and distribution system when such a system contacts the end user with an alert or warning which allows users to know that it is their service calling them, and also allows the system to verify that the intended user received the message.

It is yet another aspect of the invention to provide a method for producers of content to include authentication information in their produced content and for end users to verify that the content being reviewed is authentic information and is from the source that is being claimed.

It is yet another object of the invention to provide a system that can individually secure multiple layers of data within a single content source. For example, a piece of content used for an alert may include text, a warning message, and a photograph. Such a system would allow for the photograph to be seen only by those with "Top Secret" security clearance, the text to be seen by those with "Secret" security clearance, and the warning message to be seen by the public.

It is yet another object of the invention to store data in multimodal formats so that the data can be accessed and saved by users in a format that is appropriate for a given user at a given time. For example, a user may utter the words "save TV" to save content accessed via the user's mobile telephone for later viewing on his or her television set. In another example, a user may utter "save PDA" to download information to his or her PDA for later access when the network is unavailable, e.g., when the user is on an airplane.

It is another object of the invention to provide an information access and distribution system that allows end users or administrators to define events that can trigger notification messages to be sent to a targeted group of intended recipients. Such triggers may be activated by authorized individuals, automatic devices that are attached to the system, or by an inference engine that is programmed to predict a certain emergency or alert.

It is yet another object of the invention to provide an information access and distribution system that provides templates for allowing end users to maintain current contact and schedule information for the purpose of defining the appropriate means of contact for receiving notification messages, or defining what content is communicated to the user when calling or otherwise contacting such a system.

Some of the objects of the invention having been stated hereinabove, other objects will become evident as the description proceeds when taken in connection with the accompanying drawings.

BRIEF DESCRIPTION OF THE DRAWINGS

The file of this patent contains at least oen drawing executed in color. Copies of this patent with color drawing(s) will be provided by the Patent and Trademark Office upon request and payment of necessary fee.

Preferred embodiments of the present invention will now be explained with reference to the accompanying drawings, of which.

DESCRIPTION OF THE INVENTION

Figure 1:
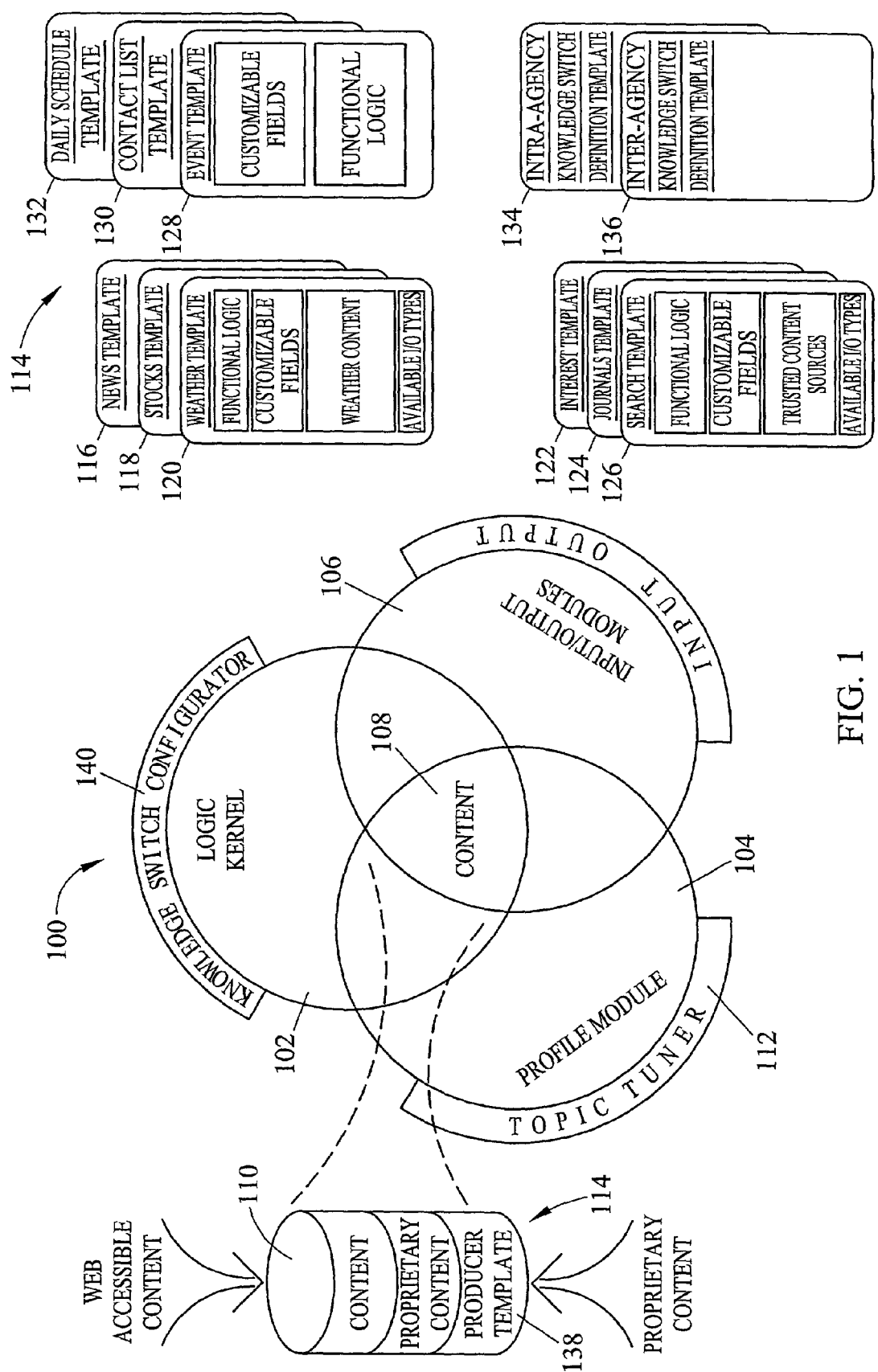
FIG. 1 is a Venn diagram of the overall architecture for a system for defining and distributing information alerts according to an embodiment of the present invention.

FIG. 1 is a Venn diagram illustrating an exemplary overall architecture for a system for routing and distributing information alerts according to an embodiment of the present invention. In FIG. 1, the system includes a KNOWLEDGE SWITCH™ 100 that includes hardware and software components for allowing individuals and groups to distribute and access information. In the illustrated embodiment, KNOWLEDGE SWITCH™ 100 includes a logic kernel 102, a profiles module 104, a plurality of input/output modules 106, and content 108 stored in one or more content databases 110. Logic kernel 102 includes software-configurable logic that performs core information access and distribution functions including searching for desired content, storing the content in database 110, detecting or allowing the documentation of the occurrence of events, notifying end users when an event or series of events occur, storing produced content, and authenticating users desiring to access or produce content.

Profiles module 104 stores information access profiles defined by end users and user groups and allows the end users to access the information via topic tuner 112. For example, a user may utilize profiles module 104 to define and store a list of stocks that the user desires to track and a keyword for retrieving information from the system regarding these stocks. Profiles module 104 may also allow users to define contact schedules and content schedules, as will be explained in more detail below. Profiles module 104 stores the user profile, provides the profile information to logic kernel 102, which obtains the requested information, and allows the user to access the information via a tuner 112. The functionality for allowing end users to define profiles and extract desired information using the profiles is described in detail in the parent application and therefore will not be described further herein.

Input/output modules 106 include hardware and software that allow information to be produced, accessed, and distributed in a variety of formats, including audio format, video format, text format, and graphics format. For example, input/output modules 106 may include web servers for serving HTML content via the Internet, voice over IP servers for serving audio content via the Internet, and wireless PDA servers for serving content to PDAs via a mobile communications network. An exemplary hardware architecture for input/output modules 106 will be described in detail below.

According to an important aspect of the invention, KNOWLEDGE SWITCH™ 100 is configurable utilizing templates 114. Templates 114 may be graphical templates or forms provided to end users and administrators via a web interface that allow the administrators and end users to tailor KNOWLEDGE SWITCH™ 100 to meet the needs of a particular organization or individual. For example, as discussed extensively in the parent application, media portal definition templates may be provided to end users to allow the users to select information sources, keywords for searching the sources, and spoken vocabulary words for accessing the search results. In FIG. 1, examples of these types of templates include news template 116, stocks template 118, weather template 120, interest template 122, journals template 124, and search template 126. Additional types of templates that will be described in detail herein include event template 128, contact list template 130, daily schedule template 132, intra-agency KNOWLEDGE SWITCH™ management template 134, and inter-agency KNOWLEDGE SWITCH™ management template 136, and a producer template 138. Using a template-based architecture allows KNOWLEDGE SWITCH™ 100 to be easily configured to meet individuals' and organizations' needs.

KNOWLEDGE SWITCH™ 100 may include a KNOWLEDGE SWITCH CONFIGURATOR™ 140 that allows an administrator to define the types of templates that are available to end users, to define events that trigger alerts for end users, and to define the functionality of a KNOWLEDGE SWITCH™ that is modifiable by end users. KNOWLEDGE SWITCH CONFIGURATOR™ 140 may be a software interface that provides templates for the administrator to perform the aforementioned functions. Exemplary templates that may be associated with KNOWLEDGE SWITCH CONFIGURATOR™ 140 will be described in more detail below.

Figure 2:
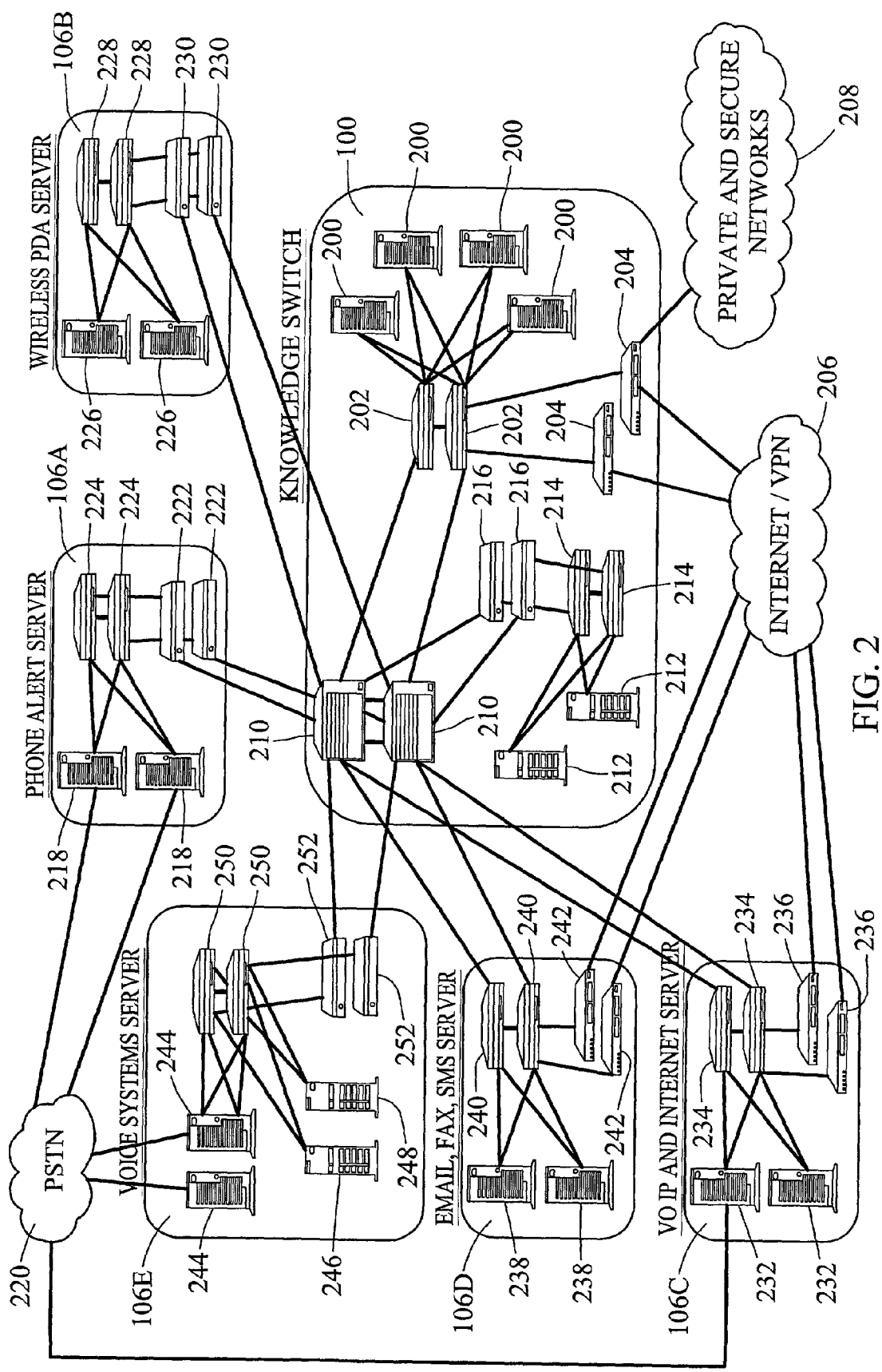
FIG. 2 is a network diagram of an exemplary hardware architecture for a system for defining and distributing information alerts according to an embodiment of the present invention.

FIG. 2 is a network diagram illustrating an exemplary hardware architecture of KNOWLEDGE SWITCH™ 100 and a plurality of input/output modules 106A–106F. In the illustrated embodiment, KNOWLEDGE SWITCH™ 100 includes database platforms 200 for storing content, user profiles, and templates. Hubs 202 connect database platforms 200 to the remaining components of KNOWLEDGE SWITCH™ 100 in a redundant manner. Firewalls 204 connect KNOWLEDGE SWITCH™ 100 to the Internet 206 and to private and secure networks 208. Routing switches 210 connect KNOWLEDGE SWITCH™ 100 to input/output modules 106A–106A. Application servers 212 include applications, such as user profile definition modules, content production modules, and notification setup modules that allow users to configure KNOWLEDGE SWITCH™ 100 using templates. Hubs 214 and load balancers 216 connect application servers 212 to the remainder of KNOWLEDGE SWITCH™ 100 in a redundant and reliable manner.

Phone alert server 106A includes hardware components for placing a large number of phone calls (up to may thousands of concurrent phone calls), and, if needed, individually authenticating the receiver of a call in an emergency situation. For example, phone alert server 106A may include hardware and software for contacting every telephone number in a geographic region and tracking whether end users are actually reached. In order to perform this function, phone alert server 106A may include one or more computing platforms 218 with interface boards that connect to public switched telephone network (PSTN) 220. For example, computing platforms 218 may be general-purpose computers with T1 interface modules (also called Digital Line Interface Cards, or DLIC's), such as those available from companies such as DIALOGIC, Aculab, or Natural Micro Systems (NMS). The T1 interface modules are digital telephony line interface cards used to connect the computer system to the end users via PSTN 220 according to a distribution list. This automatic alert functionality will be discussed in more detail below. Phone alert server 106A preferably also includes load balancers 222 and hubs 224 for reliable, redundant connection to KNOWLEDGE SWITCH™ 100.

Wireless PDA server 106B includes hardware components for sending content to and receiving content from wireless PDA device. In the illustrated embodiment, wireless PDA server 106B includes computing platforms 226 that include wireless PDA communications applications, such as ZeroCluck software available from Wireless Multimedia Systems Corporation. A hardware and software solution such as this provides the means to contact a PDA, and without intervention by the owner of the PDA device, upload and/or download information to/from the PDA. This functionality allows a user who is listening to a TOPIC RADIO™ MICROBROADCAST™ (described in detail in the parent application) the ability to hear a news article or journal article of interest and utter the command "Save PDA" and have the article delivered automatically to their PDA without any further interaction. Wireless PDA server 106B preferably also includes hubs 228 and load balancers 230 for reliable redundant connection to KNOWLEDGE SWITCH™ 100.

Voice over IP and Internet server 106C includes computing platforms 232 for interfacing with PSTN 220 and Internet 206. For example, computing platforms 232 may include voice over IP applications, such as softswitch applications and Internet applications, such as web servers. This server provides the user the ability to communicate verbally with the Knowledge Switch without needing to be connected through a PSTN telephony network. Additionally this server allows the user to have a TOPIC RADIO™ web based application running on their desktop computer and utilize a voice commanded user interface to interact with this application. Voice over IP and Internet server 106C preferably includes hubs 234 for reliable, redundant connection to KNOWLEDGE SWITCH™ 100. Voice over IP and Internet server 106C may also include firewalls 236 for providing a secure connection to Internet/VPN 206.

Email, fax, and SMS server 106D includes computing platforms 238 for communicating with end users via email, fax, and short message service networks. For example, computing platforms 238 may include simple mail transport protocol (SMTP) applications for sending and receiving messages via email. Computing platforms 238 may also include facsimile applications for sending and receiving faxes. Finally, computing platforms 238 may include short message service applications, such as IS-41 or GSM-compliant applications for sending and receiving short messages via a mobile communications network. Email, fax, and SMS server 106D may include hubs 240 for reliable, redundant connection to KNOWLEDGE SWITCH™ 100 and firewalls 242 for providing a secure connection to Internet and secure VPN connections to the system 206.

Voice systems server 106E includes computing platforms 244 for providing a voice interface that allows end users to access search results via KNOWLEDGE SWITCH™ 100. For example, computing platforms 244 may include audio browser applications that allow end users to retrieve search results based on end user defined spoken vocabulary words, as described in the parent application. Voice system server 106E may also include automated speech recognition (ASR), voice authentication, and text to speech (TTS) servers 246 and 248 for recognizing an individual's speech, authenticating that a voice belongs to a specific individual, and converting search results from text to spoken format. Voice system server 106E may also include hubs 250 and load balancers 252 for reliable, redundant connection to KNOWLEDGE SWITCH™ 100.

As indicated in FIG. 1, KNOWLEDGE SWITCH™ 100 is configurable by end users using templates 116–138 to perform various content delivery functions. The templates include media portal templates, such as templates 116–126, that allow end users to create customized media portals. These types of templates were described in detail in the parent application and will not be described in further detail herein. One type of template according to the present invention includes templates that allow users to configure KNOWLEDGE SWITCH™ 100 to deliver information to individuals in response to the occurrence of predetermined events. Such templates are generically referred to herein as alert templates. The alert templates may be accessible via both end users and administrators via a web interface to configure KNOWLEDGE SWITCH™ to deliver alert messages to an individual recipient and/or to very large recipient groups in response to an event or series of events.

Figure 3:
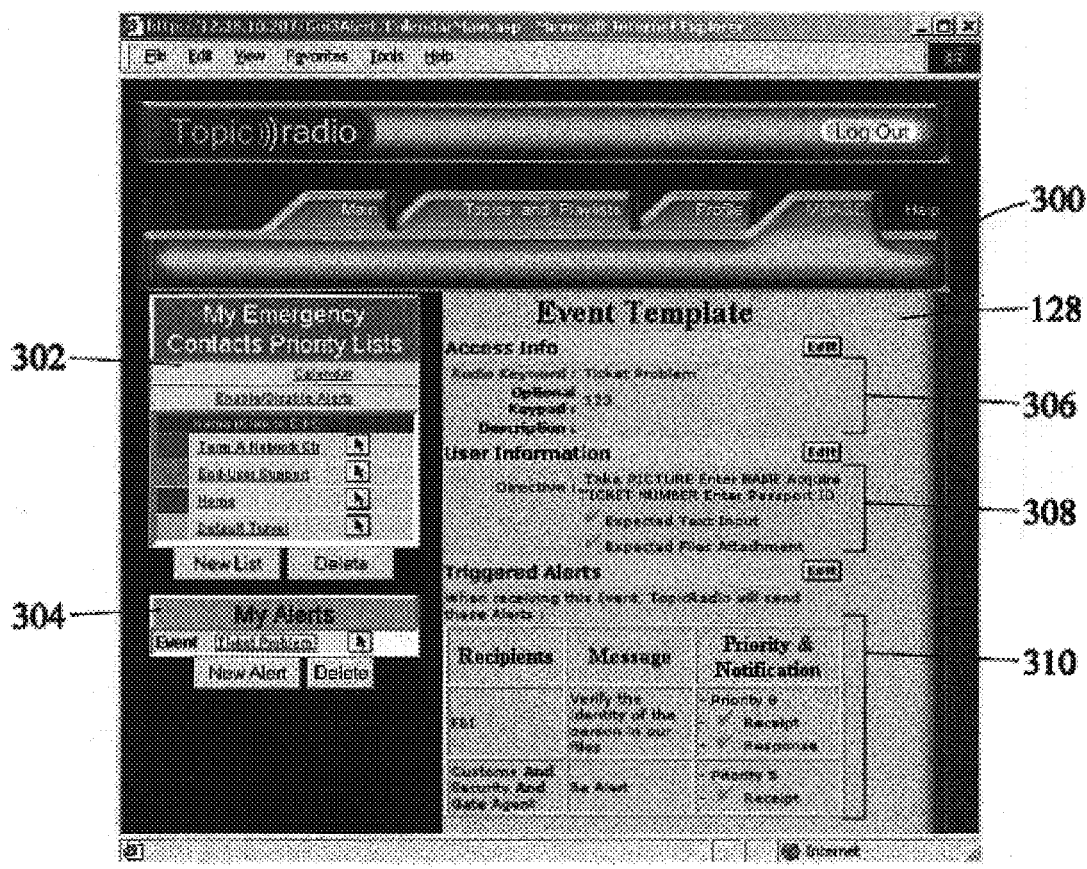
FIG. 3 is a computer screen shot of an event template according to an embodiment of the present invention.

One type of alert template that may be used to configure KNOWLEDGE SWITCH™ 100 to deliver alert messages is event template 128. FIG. 3 is a computer screen shot of an alerts folder 300 including an event template 128, a contact interface 302, and an alerts interface 304 according to an embodiment of the present invention. Event template 128 allows users to configure KNOWLEDGE SWITCH™ 100 to deliver alert messages to individuals in response to predetermined events. Contact interface 302 allows users to access templates for defining and editing contact profiles used by KNOWLEDGE SWITCH™ 100 to contact individuals. Alert interface 304 allows users to access event template 128 to add, edit, and delete alerts.

Figure 4:
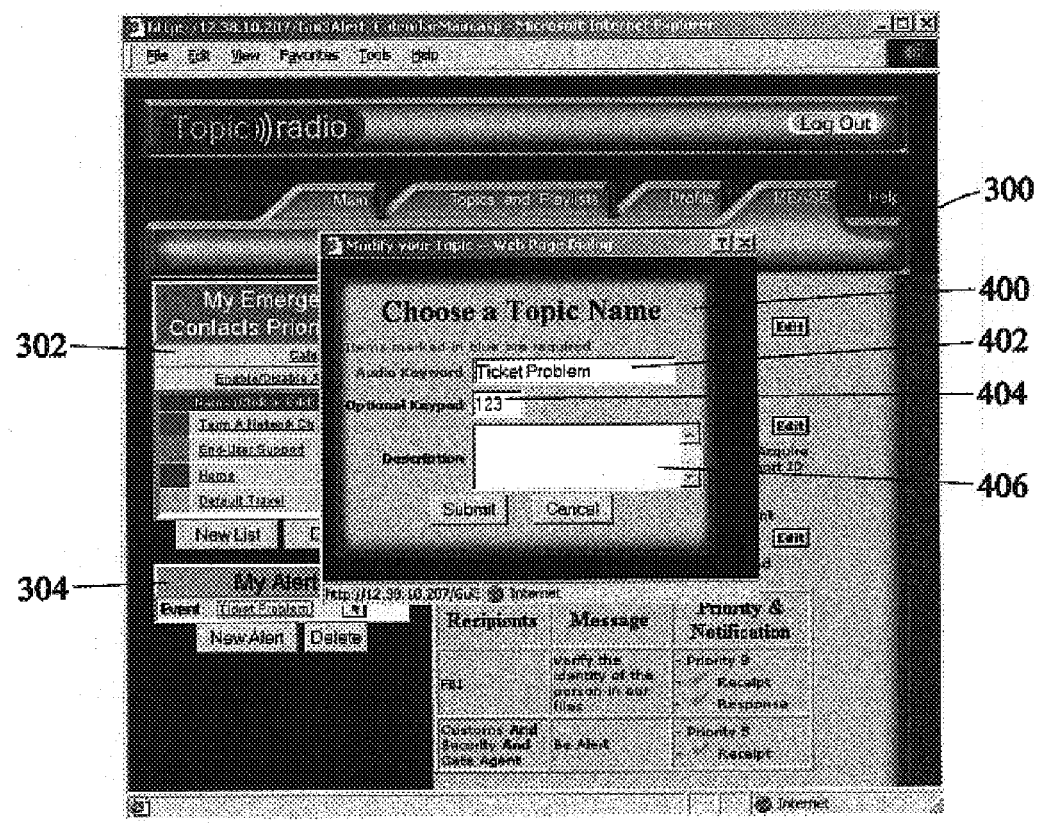
FIG. 4 is a computer screen shot of an access information dialog box associated with the event template illustrated in FIG. 3.

In FIG. 3, event template 128 includes customizable fields 306, 308, 310 for allowing an administrator to define KNOWLEDGE SWITCH™ functionality associated with an event. For example, customizable field 306 allows the administrator to define access information for an event that allows end users to communicate an event to KNOWLEDGE SWITCH™ 100. In the illustrated example, the access information includes a spoken command, "ticket problem," and a keypad event ID "123" that allow end users communicate an event to KNOWLEDGE SWITCH™ 100 using a mobile or landline telephone. FIG. 4 illustrates an exemplary dialog box that allows the administrator to define and edit the access information that appears in customizable field 306. In the illustrated example, dialog box 400 includes an input area 402 that allows the end user to define a spoken command associated with the event being defined. This is the word that a user will speak in his or her mobile handset in order to trigger KNOWLEDGE SWITCH™ 100 to perform defined functions associated with a ticket problem event. Input area 404 allows the administrator to define default keys that the user detecting the ticket problem event inputs via a telephone keypad to trigger KNOWLEDGE SWITCH™ 100 to perform ticket problem event functions. Input area 406 allows the administrator to input a description of the event to be displayed on event template 128.

Referring again to FIG. 3, customizable field 308 of event template 128 allows the administrator to define information that KNOWLEDGE SWITCH™ 100 will provide to a user when the user contacts KNOWLEDGE SWITCH™ 100 using the spoken command or keypad keys associated with the ticket problem event. In the illustrated example, the user information includes a directive instructing user to enter the name, acquire a ticket number, and enter the passport ID of an airline passenger whose identification information does not match the identification information on the ticket present to the gate agent.

Figure 5:
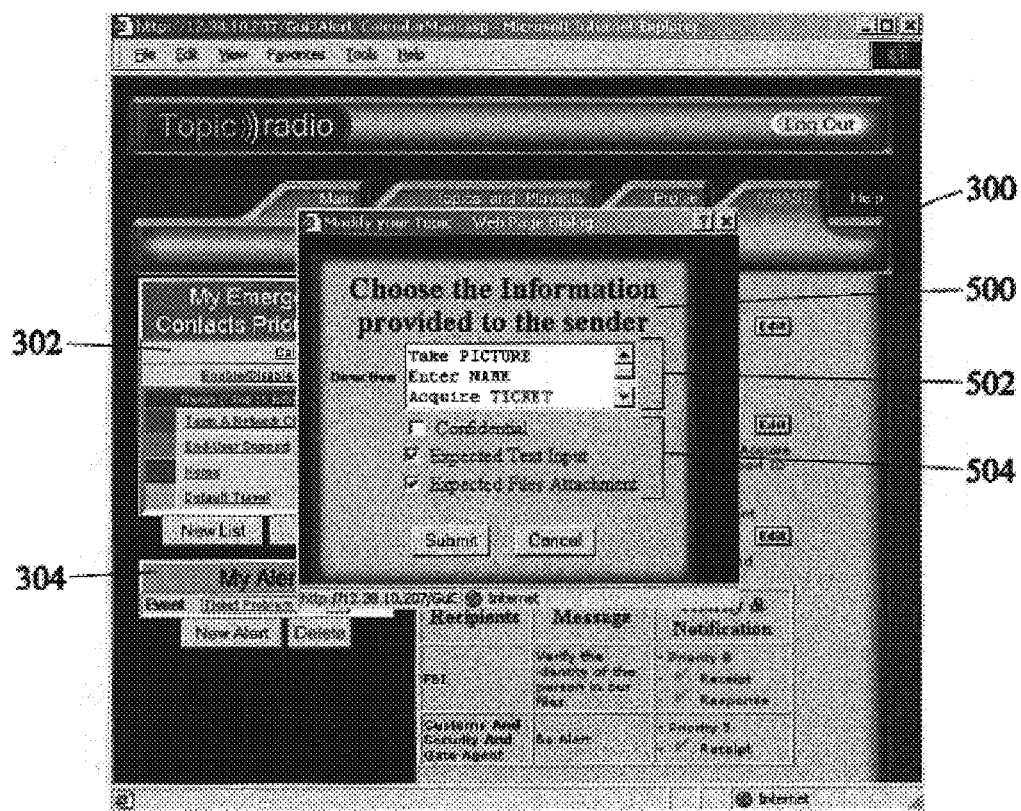
FIG. 5 is a computer screen shot of a user information dialog box associated with the event template illustrated in FIG. 3.

FIG. 5 illustrates an exemplary dialog box that allows the administrator to define and edit information to be included in customizable user information field 308 illustrated in FIG. 3. In the illustrated example, dialog box 500 includes a first input area 502 used by the administrator to input a directive to be sent to airline employees. In this example, the directive instructs the employees to take a picture of the passenger, enter the name of the passenger, and acquire the passenger's ticket. Input area 504 contains check boxes where the administrator defines the type of input expected from the airline employees. In this example, since the picture will be stored as a computer file and the passenger's name will be in text format, the text input and attached file check boxes are marked.

Figure 6:
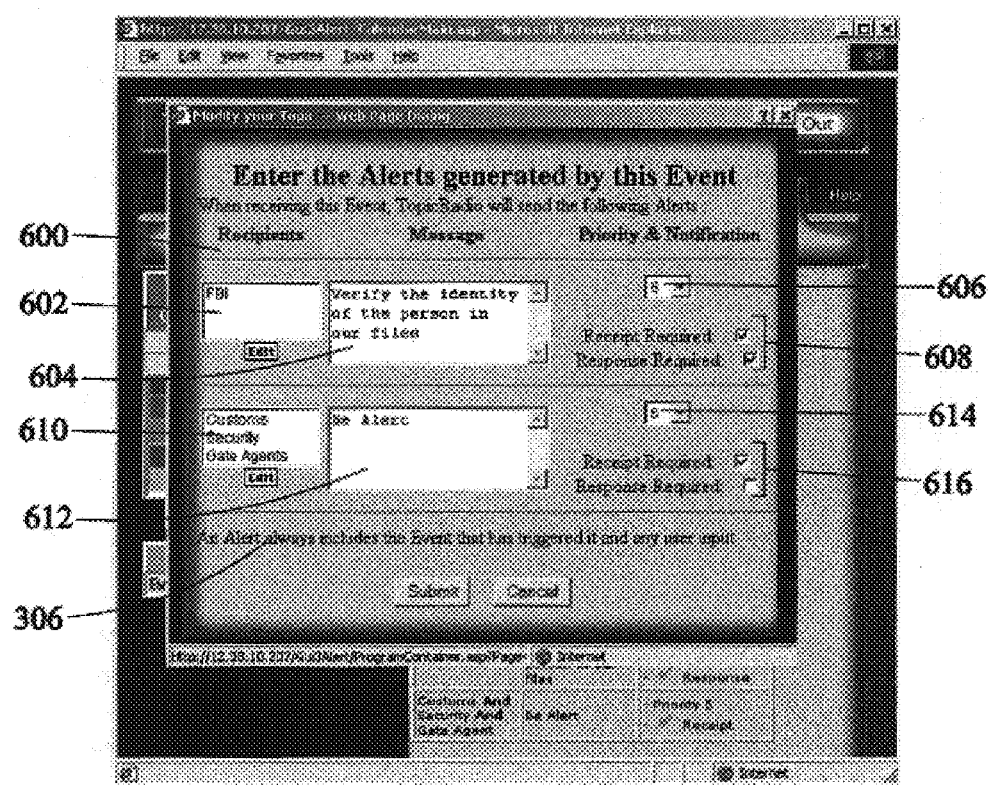
FIG. 6 is a computer screen shot of an alert definition dialog box associated with the event template illustrated in FIG. 3.

Referring again to FIG. 3, customizable triggered alerts information field 310 allows the administrator to configure KNOWLEDGE SWITCH™ 100 to tailor alert messages for specific recipient groups. For example, the administrator can define recipient groups, such as the FBI and gate agents, and different messages to be delivered to each group for the same event. FIG. 6 illustrates an exemplary dialog box that the administrator uses to configure KNOWLEDGE SWITCH™ 100 to deliver different triggered alert messages to different groups of individuals. In the illustrated example, dialog box 600 includes a recipients input area 602 where the administrator inputs the recipients of the alert message. Message input area 604 allows the administrator to input a message to be transmitted to the recipient when an event occurs. The ability to define different messages to be sent to different recipient groups in response to the same events is an important feature of the invention.

Priority and notification input area 606 allows the administrator to input a priority level for the message. KNOWLEDGE SWITCH™ 100 uses the priority level to determine the priority with which the message is to be sent. For example, KNOWLEDGE SWITCH™ may deliver messages of higher priority before messages of lower priority when an event is detected.

Response and receipt input area 608 allows the administrator to input whether or not confirmation of receipt of the message is required and whether a response to the message is required. KNOWLEDGE SWITCH™ 100 uses the response and receipt information provided in input area 608 to determine the appropriate action to take if KNOWLEDGE SWITCH™ 100 does not receive confirmation of receipt or a response to a message. For example, when confirmation of receipt is not received within a predetermined time period, KNOWLEDGE SWITCH™ 100 may resend the message and alert the administrator that confirmation and/or a response has not been received.

Input areas 610, 612, 614, and 616 allow the administrator to configure KNOWLEDGE SWITCH™ 100 to deliver different message to be delivered to a different recipient group in response to detecting an event. As stated above, providing a user-friendly interface that allows an administrator to configure KNOWLEDGE SWITCH™ 100 to define different messages to be delivered to different recipient groups is an important feature of the invention. Because event template 128 allows different messages to be defined for different groups, the amount of effort required to set up automatic inter-agency communication is greatly reduced. In the example illustrated in FIGS. 3–6, the administrator has configured KNOWLEDGE SWITCH™ 100 such that a ticket problem event will trigger a "Be Alert" message of medium priority without need for a response that will be sent to airport customs, security, and gate agents. KNOWLEDGE SWITCH™ 100 will deliver a separate message to the FBI. The message is of higher priority, a response is required, and the specific instructions are "verify the identity of the person in our files."

Referring again to FIG. 3, the administrator can edit alerts created using event template 128 using alerts interface 304. Alerts interface 304 lists alerts that have been defined for or by a particular user. If the user has the appropriate access clearance, the user can edit alerts, define new alerts, or delete alerts simply by clicking on the appropriate area of alerts interface 306. Alerts interface 306 thus allows multiple alerts to be defined for users.

Figure 7:
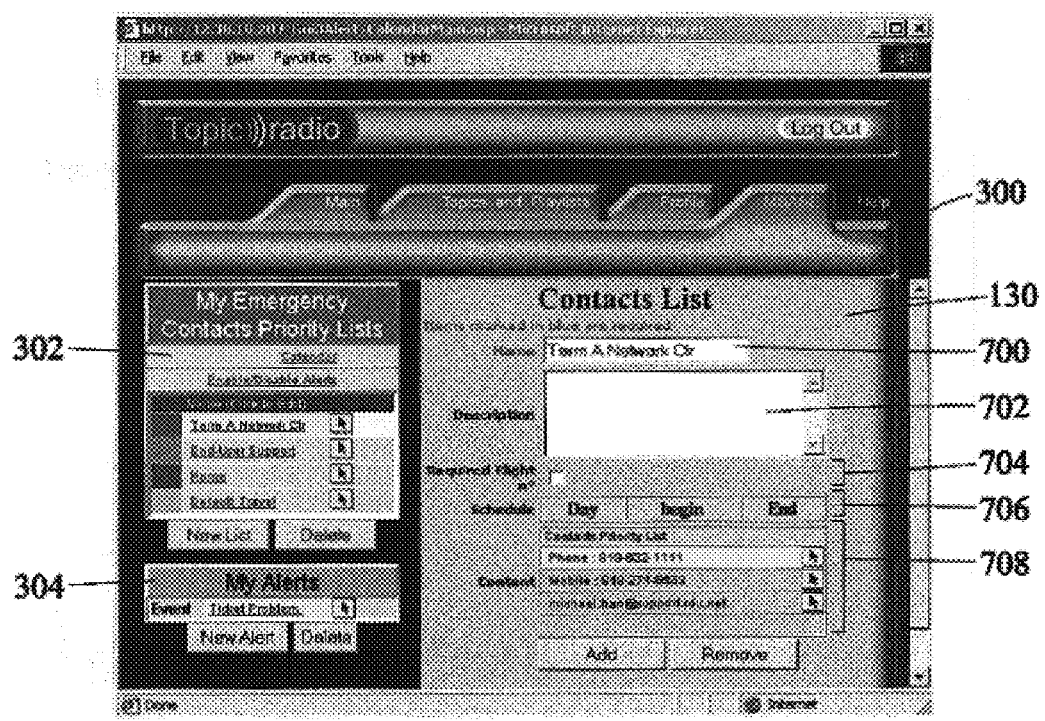
FIG. 7 is a computer screen shot of a contact list template according to an embodiment of the present invention.

As mentioned above with regard to FIG. 2, the present invention includes a contact interface 302 that provides user access to contact and scheduling templates for configuring KNOWLEDGE SWITCH™ 100 to use the appropriate contact information when attempting to contact end users. FIG. 7 illustrates an exemplary contact list template 130 accessible via contact interface 302 according to an embodiment of the present invention. In FIG. 7, contact list template 130 includes a customizable contact profile name field 700 where the user defines a name for the contact profile. Input area 702 allows the user to input a description of the contact profile. Input area 704 allows the user to define a specific contact profile as a travel profile that would be used with airline travel, and thus requests travel information each time it was entered into a user's schedule. Input area 706 allows the end user to access a schedule template for defining a schedule to be associated with the contact profile. Input area 708 includes contact information, such as telephone numbers and email addresses, for the user's contact profile.

Figure 8:
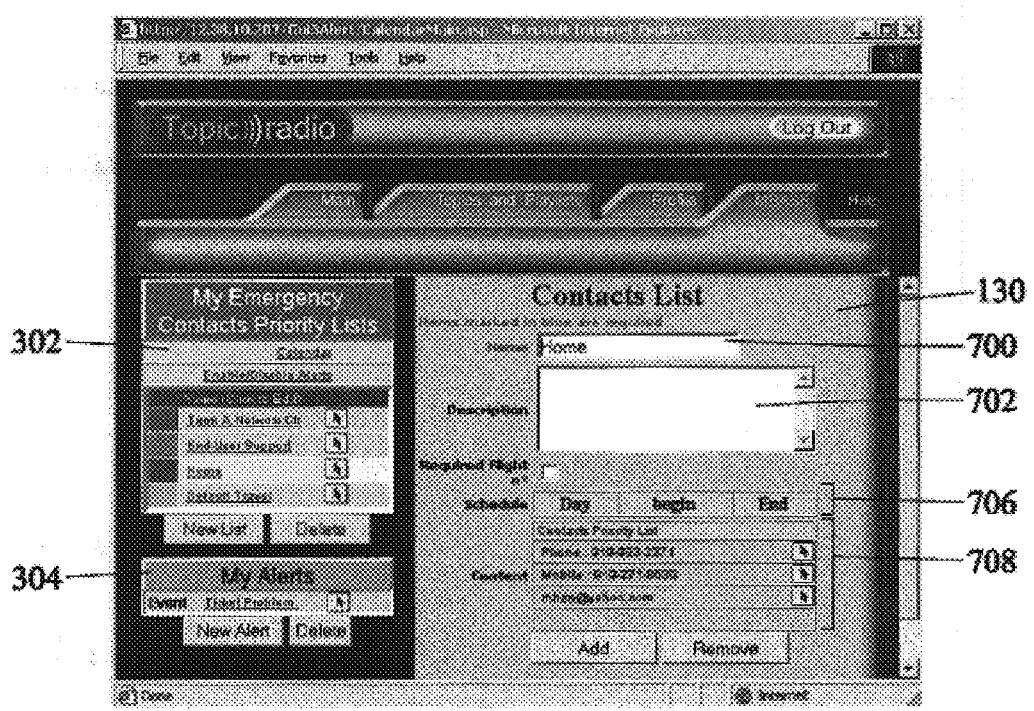
FIG. 8 is a computer screen shot of a contact list template according to an embodiment of the present invention.

According to an important aspect of the invention, a user may define multiple contact profiles. For example, a user may define an "at work" contact profile as illustrated in FIG. 7 and an "at home" profile for contacting the individual at home. FIG. 8 illustrates an example of an "at home" profile that a user may define. Input areas 700–708 are the same as those described above with respect to FIG. 7. Hence, a description thereof will not be repeated herein.

Figure 9:
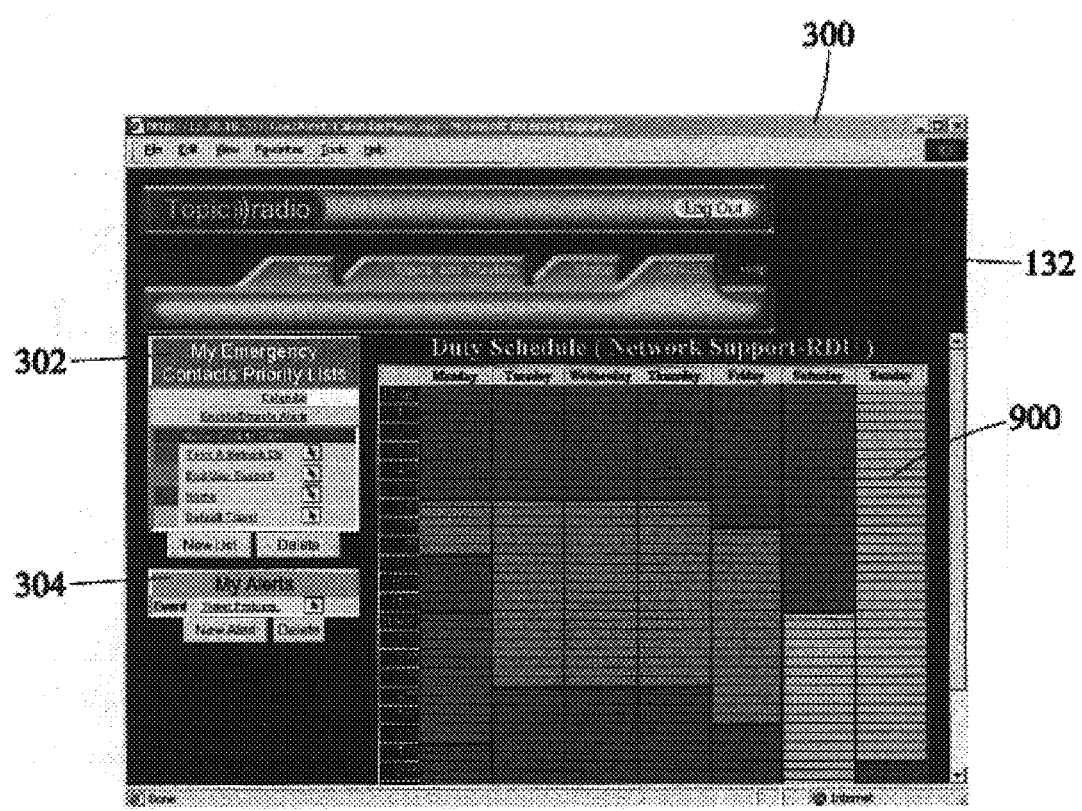
FIG. 9 is a computer screen shot of a schedule template according to an embodiment of the present invention.

As discussed above with respect to FIG. 3, the present invention may also include a schedule template that allows users to associate schedule information with contact profiles. FIG. 9 is a screen shot of an exemplary daily contact schedule template according to an embodiment of the present invention. The daily contact schedule template may be accessible by click on schedule input area 706 illustrated in FIGS. 7 and 8. In FIG. 9, daily schedule template 132 includes a user-editable calendar 900 that allows the user to associate days and times with contact profiles. The shaded areas in schedule 900 correspond to the shaded areas in contact interface 302. In order to associate a time of day with a contact profile, the user simply clicks in the appropriate time cell in daily schedule 900 and selects one of the defined contact profiles. Providing an easy-to-use interface that allows a user to associate contact information with the time of day increases the likelihood that an alert will reach the user because the user is more likely to keep his or her contact information current.

Figure 10:
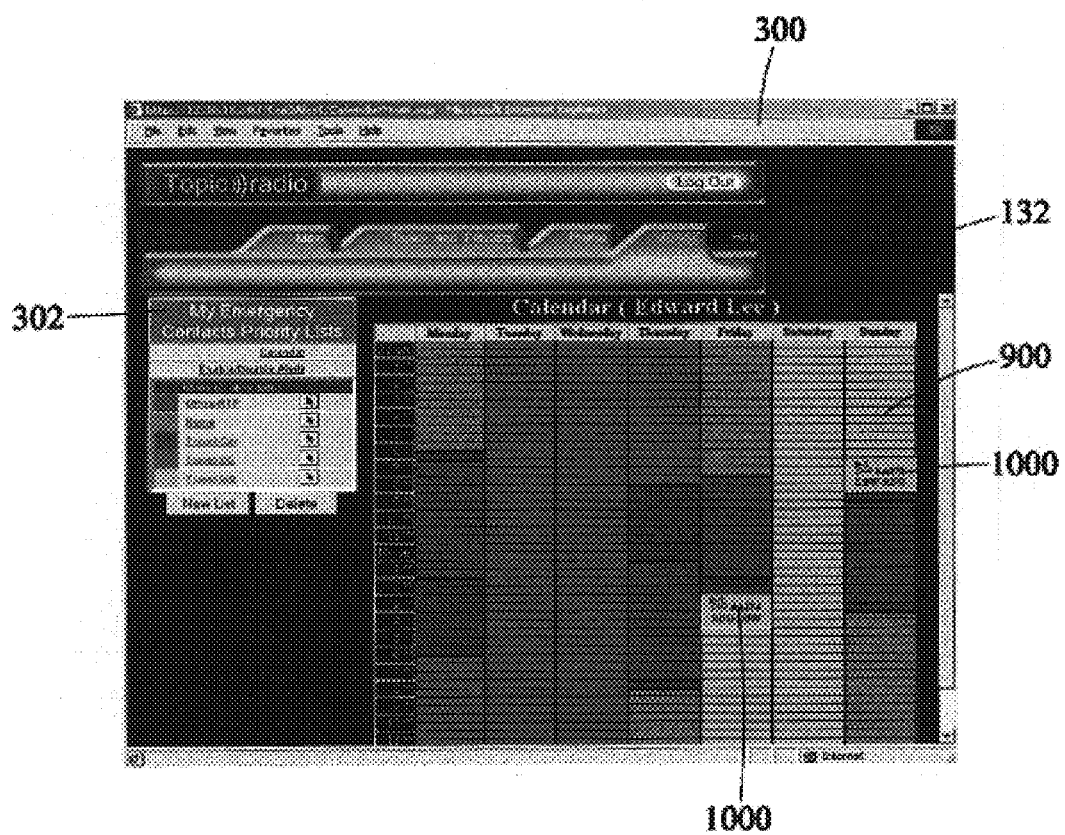
FIG. 10 is a computer screen shot of an individual schedule screen for associating contact profiles with the schedule according to an embodiment of the present invention.

In addition to associating date information with contact information, calendar 900 may also allow the user to input additional relevant information relating to his or her schedule. For example, referring to FIG. 10, calendar 900 allows the user associate airline flight numbers 1000 with the user's contact information.

Figure 11:
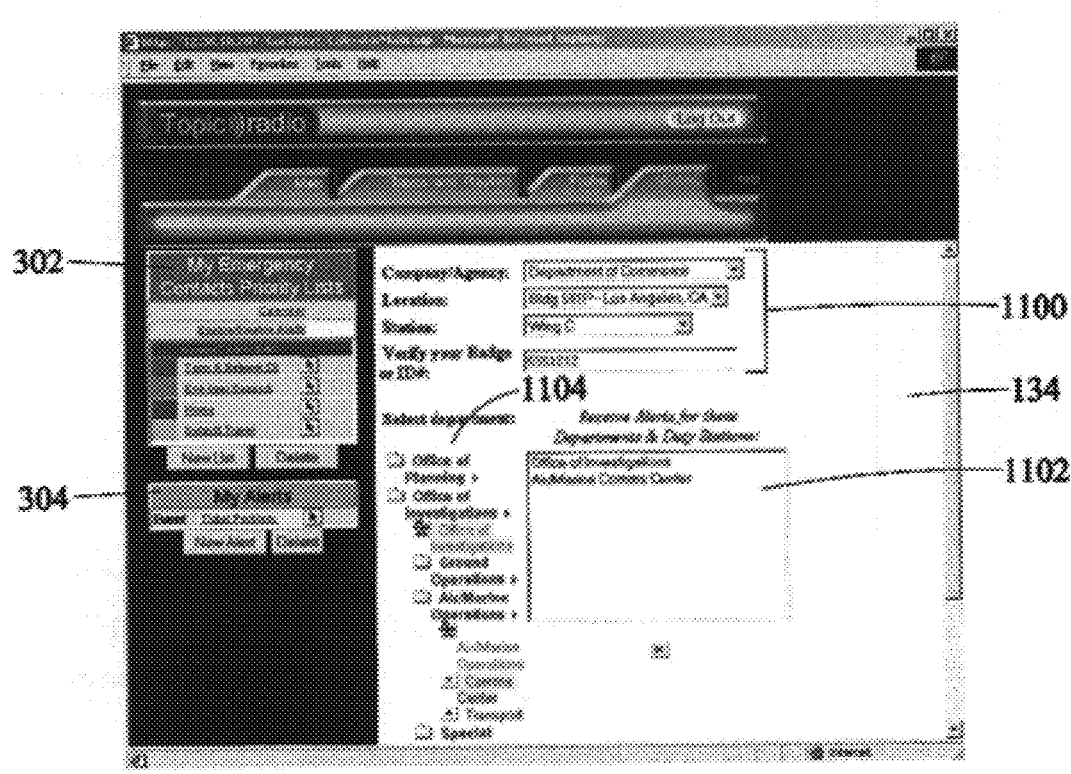
FIG. 11 is a computer screen shot of an intra-agency KNOWLEDGE SWITCH™ management template according to an embodiment of the present invention.

According to yet another important aspect of the invention, templates may be provided for allowing users with the appropriate security clearance to configure both intra-agency and inter-agency KNOWLEDGE SWITCH™ functionality. FIG. 11 illustrates an intra-agency KNOWLEDGE SWITCH™ management template according to an embodiment of the present invention. In FIG. 11, intra-agency KNOWLEDGE SWITCH™ management template 134 includes a first input area 1100 for receiving user information and user authentication information. A second input area 1102 allows the user to input departments within an agency for which the user desires to receive copies of alert messages. In the illustrated example, the user has selected to receive copies of alert messages for the Office of Investigations and the Air/Marine Communications Center. An agency department directory tree 1104 contains a hierarchical listing of departments within an agency for the user to select and include in input area 1102. KNOWLEDGE SWITCH™ 100 uses the information provided by the user in input area 1102 to identify users to be copied on alert messages to other users. This functionality will be described in more detail below.

Figure 12:
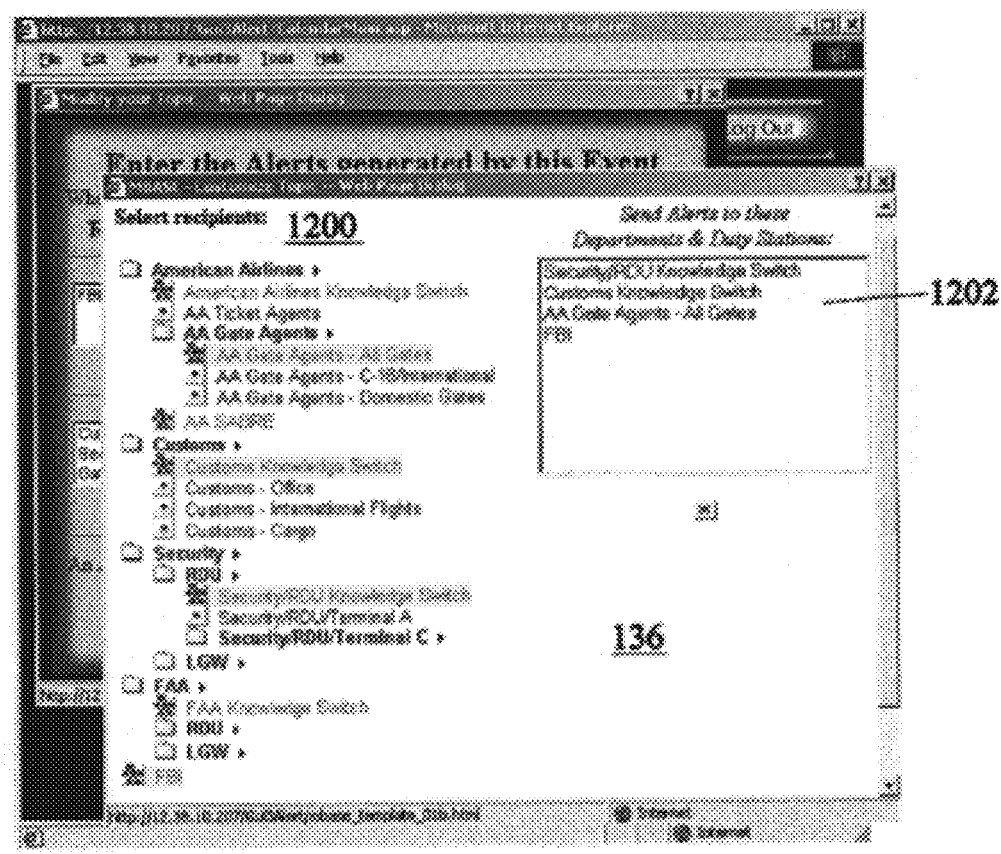
FIG. 12 is a computer screen shot of an inter-agency KNOWLEDGE SWITCH™ management template according to an embodiment of the present invention.

In addition to intra-agency KNOWLEDGE SWITCH™ management, the present invention also includes a template that allows authorized users to perform inter-agency KNOWLEDGE SWITCH™ management. FIG. 12 is a screen shot of an inter-agency KNOWLEDGE SWITCH™ management template according to an embodiment of the present invention. In FIG. 12, inter-agency KNOWLEDGE SWITCH™ management template 136 includes a recipients directory tree 1200 that lists KNOWLEDGE SWITCHES™ associated with different agencies and recipient groups within each agency. For example, the directory tree includes KNOWLEDGE SWITCHES™ for American Airlines, Customs, and Security and recipient groups within each category. The user may select any of the KNOWLEDGE SWITCHES™ or recipients from recipients directory tree 1200, and the selection(s) will appear in input area 1202. A central KNOWLEDGE SWITCH™ uses the data provided by the user in input area 1202 to determine recipients for various types of alert messages. Thus, template 136 provides an easy-to-use interface for allowing a single user to control alert message distribution between different agencies.

Figure 13:
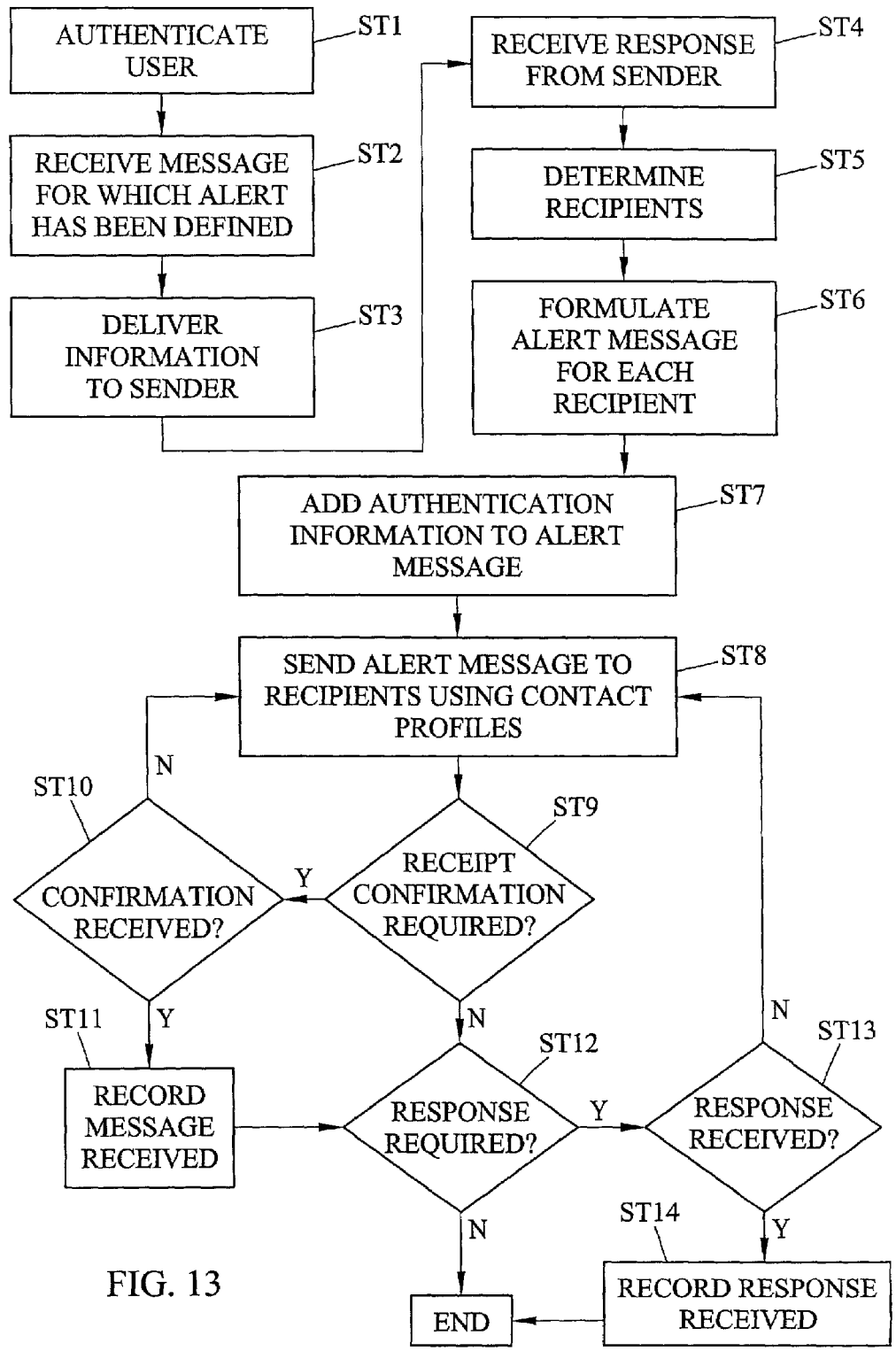
FIG. 13 is a flow chart illustrating exemplary KNOWLEDGE SWITCH™ functionality associated with delivering an alert according to an embodiment of the present invention.

FIG. 13 is a flow chart illustrating the operation of KNOWLEDGE SWITCH™ 100 based on information entered by users via templates, as described above. Referring to FIG. 13, in step ST1, when a user attempts to access KNOWLEDGE SWITCH™, KNOWLEDGE SWITCH™ 100 authenticates the user. For example, if the user is accessing KNOWLEDGE SWITCH™ 100 via a mobile telephone KNOWLEDGE SWITCH™ 100 may require the user to speak or key in a user ID and a password. KNOWLEDGE SWITCH™ 100 may compare the user ID and password with a password for the user stored in a user database managed by KNOWLEDGE SWITCH™ 100. Once the user has been authenticated, the user may communicate an event to KNOWLEDGE SWITCH™ 100, for example by speaking the voice command or event ID associated with an event. Once KNOWLEDGE SWITCH™ receives the event ID, in step ST3, KNOWLEDGE SWITCH™ 100 sends predetermined information to the event sender. For example, in the ticket problem event discussed above, if the sender is a gate agent in an airport, KNOWLEDGE SWITCH™ 100 sends a directive to the gate agent to acquire a digital photograph, enter the name, and acquire a ticket from the passenger. In step ST4, KNOWLEDGE SWITCH™ 100 receives a response from the sender.

The present invention is not limited to receiving notification of events from end users. For example, in an alternate embodiment, KNOWLEDGE SWITCH™ 100 may include hardware and software for automatically detecting events. For example, in the United States, when an airplane crashes, a beacon transmits a signal from the crash site. The beacon is detected by FAA receivers and communicated to FAA computers. In this example, KNOWLEDGE SWITCH 100 may be coupled to FAA computers to detect crash events.

In step ST5, KNOWLEDGE SWITCH™ 100 determines the intended recipients of alerts triggered by the ticket problem event. This step may include searching databases 200 using the event name or event ID received from the gate agent. Potential recipients for the message may be other users within the same agency or organization or users within other organizations via KNOWLEDGE SWITCHES™ associated with the other organizations. For example, a KNOWLEDGE SWITCH™ associated with an airline may send an alert to its employees who were configured to receive the alert and to a central KNOWLEDGE SWITCH™. The central KNOWLEDGE SWITCH™ may then distribute the alert to recipients in other organizations.

In step ST6, KNOWLEDGE SWITCH™ 100 formulates the alert message to be sent to each recipient. For example, if KNOWLEDGE SWITCH™ 100 is the central KNOWLEDGE SWITCH™, KNOWLEDGE SWITCH™ 100 may send one message to users in one agency and another message to users in another agency. For the ticket problem event, KNOWLEDGE SWITCH™ 100 may generate a message for FBI users that includes the photograph and passport ID of the passenger and instructions to check FBI files for the passenger. For Federal Air Marshals, KNOWLEDGE SWITCH™ 100 may generate a generic message, such as "be alert," and include the photograph of the passenger.

Once the proper messages have been formulated, in step ST7, KNOWLEDGE SWITCH™ 100 adds authentication information to each of the messages. In one exemplary embodiment, the authentication information may be a digital signature signed using the private encryption key of KNOWLEDGE SWITCH™ 100. End users or the KNOWLEDGE SWITCH™ that serves the end users may verify the signature by decrypting the signed messages using the public encryption key of KNOWLEDGE SWITCH™ 100. If the decrypted signature matches the message, then the message is determined to be authentic. That is, because KNOWLEDGE SWITCH™ 100 is the only entity that knows its private key, the user knows that the message came from KNOWLEDGE SWITCH™ 100.

In step ST8, KNOWLEDGE SWITCH™ 100 sends the alert to each of the intended recipients using contact profiles defined by the recipients. Sending the alert to each of the intended recipients may include identifying portions of the alert to be delivered to each of the recipients based on a certificate level associated with the portions of the alerts and a certificate level associated with each of the recipients. For example, an alert may include classified information and unclassified information. Only recipients with the appropriate security clearances may receive the classified information. Other recipients may receive the unclassified information. KNOWLEDGE SWITCH™ 100 may include software for parsing documents based on recipient certificate levels, such as NEED TO KNOW from Info Assure Corporation.

Another aspect of delivering information to recipients may include detecting congestion in the delivery network and rerouting traffic to an alternate delivery network. For example, if the network used to deliver the alert messages is the PSTN, SS7 congestion messages transmitted between end offices may indicate that the PSTN is congested and that a recipient or group or recipients are unable to be reached because all of the trunks associated with an end office are in use. In this situation, knowledge switch 100 may reroute the alert messages to be delivered over a data network, such as the Internet, or poll alternative KNOWLEDGE SWITCHES to determine if the users can be alerted via a KNOWLEDGE SWITCH in a different geographic location The use of on-line, updateable contact profiles increases the likelihood that the alerts will reach the intended recipients using the appropriate format. In one embodiment, KNOWLEDGE SWITCH™ 100 may perform a mass callout where all users in a particular geographic area are called via the telephone network using phone alert server 218 described above with respect to FIG. 2.

Once the recipient receives the alert, the recipient can listen to or view the message using a defined end-user device, such as a mobile telephone, PDA, computer, etc. In addition, if the end user desires to access the message in a later format, the end user can utter the words "save (MEDIUM)" where (MEDIUM) indicates the medium in which the user desires to later access the information, such as email, fax, etc. KNOWLEDGE SWITCH™ 100 may include a media format translator, such as a text-to-speech/speech-to-text converter along with the appropriate delivery hardware described above with respect to FIG. 2 in order to perform this function.

In step ST9, once the alert has been sent, KNOWLEDGE SWITCH™ 100 determines whether confirmation of receipt is required. As discussed above, event template 124 allows users to set up whether receipt confirmation is required when the alert is defined. If confirmation of receipt is required, KNOWLEDGE SWITCH™ determines whether the confirmation has received (step ST10). If the confirmation was not received, KNOWLEDGE SWITCH™ 100 may resend the message. If the confirmation is received, in step ST11, KNOWLEDGE SWITCH™ 100 records the fact that the alert was received by the end user.

In step ST12, KNOWLEDGE SWITCH™ 100 determines whether a response is required for the alert. Like receipt confirmations, response requirements can be set up using event template 124, as discussed above. If a response is required, KNOWLEDGE SWITCH™ 100 determines whether the response has been received (step ST13). If a response has not been received, KNOWLEDGE SWITCH™ 100 may resend the alert. If a response has been received, KNOWLEDGE SWITCH™ 100 may record the fact that a response has been received (step ST14).

Figure 14A:
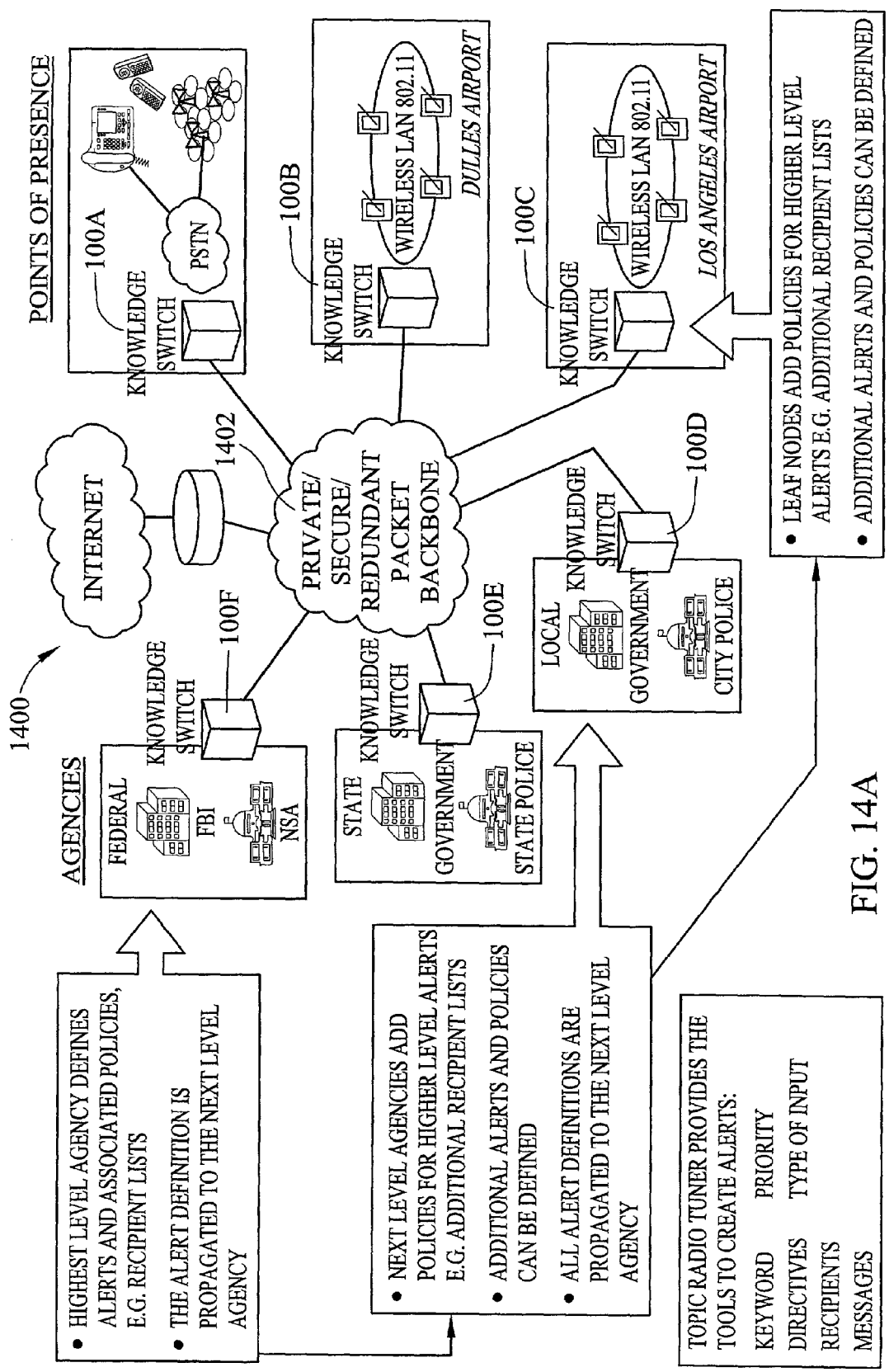
FIGS. 14A and 14B are a network diagrams illustrating an information alert definition and distribution system according to an embodiment of the present invention.
Figure 14B:
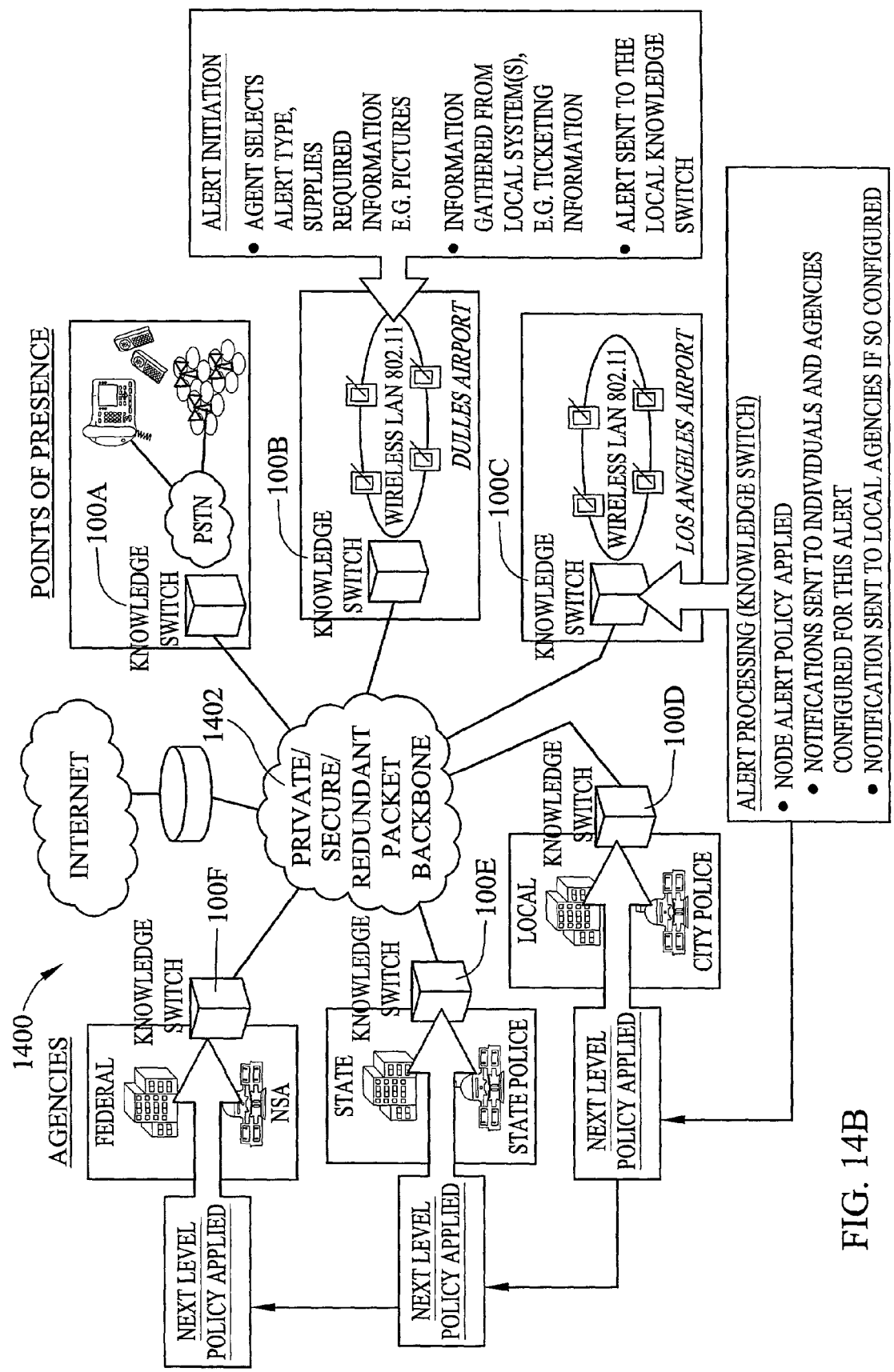

FIGS. 14A and 14B are network diagrams illustrating an information alert definition and distribution system according to an embodiment of the present invention. In FIGS. 14A and 14B, system 1400 includes a plurality of first KNOWLEDGE SWITCHES™ 100A–100C located at predetermined points of presence, such as airports or businesses. A plurality of second KNOWLEDGE SWITCHES™ 100D–100F are located at predetermined agencies, such as federal and state law enforcement agencies. Each KNOWLEDGE SWITCH™ 100A–100F may be similar in structure to knowledge switch 100 described above. KNOWLEDGE SWITCHES™ 100A–100F may be connected via computer network 1402.

An example of system-wide KNOWLEDGE SWITCH™ operation will now be described. In FIG. 14A, each KNOWLEDGE SWITCH™ defines its alerts and associated policies using templates, as described above. In FIG. 14B, when one of first KNOWLEDGE SWITCHES™ 100A–100C receives an alert, the receiving KNOWLEDGE SWITCH™ applies its alert policies to determine how to distribute the alert. The receiving KNOWLEDGE SWITCH™ then distributes the alert to local individuals and to appropriate agency KNOWLEDGE SWITCHES™ 100D–100F based on the alert policy. Each agency knowledge switch applies its own alert policies and distributes the alert to appropriate individuals within the agency. As discussed above, applying an alert policy may include parsing the alert and distributing portions of the alert to individuals based on individuals certificate levels. Thus, the system of KNOWLEDGE SWITCHES™ illustrated in FIG. 14 delivers alerts to selected individuals even when the individuals are associated with different agencies.

Thus, as illustrated herein, KNOWLEDGE SWITCH™ 100 can be configured using templates to meet a particular organizations needs. KNOWLEDGE SWITCH™ 100 includes a modular hardware architecture in which components can be replaced without affecting other components. KNOWLEDGE SWITCH™ 100 is configurable to send alert messages to users and to other KNOWLEDGE SWITCHES™. Using templates, KNOWLEDGE SWITCH™ 100 can be configured to deliver different alerts to different groups of individuals in response to the same event.

It will be understood that various details of the invention may be changed without departing from the scope of the invention. Furthermore, the foregoing description is for the purpose of illustration only, and not for the purpose of limitation—the invention being defined by the claims.

What is claimed is:

1. A knowledge switch comprising:
(a) a logic kernel for receiving event information regarding a security event for which an information alert has been defined, for locating the corresponding information alert, and for automatically distributing the information alert to intended recipients;
(b) a content database accessible by the logic kernel for storing information received from public and private computer networks, the information including the information alert;
(c) a profiles module for storing user profiles including information for distributing the the information alert to the intended recipients, the profiles module including a contact list template for receiving input from a user for defining a plurality of different contact profiles of the user for delivering the information alert to the user, each contact profile indicating at least one mode and contact information for delivering the information alert to the user in the at least one mode, and a schedule template for associating a plurality of different time periods with the different contact profiles, wherein the knowledge switch is adapted to deliver the information alert to the user using at least one of the contact profiles and time periods specified by the user;
(d) a plurality of input/output modules for distributing the information alert to the intended recipients via defined user devices; and
(e) a knowledge switch configurator including functionality for allowing an administrator to define the event information, the information alert to be associated with the event information, and content to be included in the information alert, the content including a directive for instructing the intended recipients regarding action to be taken in response to the security event.

2. The knowledge switch of claim 1 wherein the logic kernel includes software that is configurable by end users or administrators using templates provided by the knowledge switch configurator.

3. The knowledge switch of claim 1 wherein the profiles module stores media portals defined by end users.

4. The knowledge switch of claim 1 wherein the input/output modules include a web server for sending and receiving information via the Internet.

5. The knowledge switch of claim 1 wherein the input/output modules include a wireless PDA server for sending information to and receiving information from a wireless PDA.

6. The knowledge switch of claim 1 wherein the input/output modules include a phone alert server for automatically distributing the information alert to the intended recipients via a telephone network.

7. The knowledge switch of claim 1 wherein the input/output modules include a fax, email, and SMS server for sending and receiving messages in fax, email, and SMS format.

8. The knowledge switch of claim 1 comprising an event template associated with the knowledge switch configurator, the event template including customizable fields for configuring the logic kernel to deliver information alerts to the intended recipients in response to defined event triggers, wherein the event triggers are activatable by at least one of: authorized individuals, devices, and an inference engine programmed to predict an emergency.

9. The knowledge switch of claim 8 wherein the event template includes a customizable field for configuring the logic kernel to deliver different information alerts to different individuals.

10. The knowledge switch of claim 1 wherein the contact list template includes user-editable fields for specifying contact information for contacting the user via each of a plurality of contact modes for each contact profile.

11. The knowledge switch of claim 1 wherein the schedule template includes a user-editable calendar for associating times of day with each contact profile.

12. The knowledge switch of claim 1 comprising an intra-agency knowledge switch management template associated with the knowledge switch configurator, the intra-agency knowledge switch management template comprising an interface for configuring the logic kernel to distribute information alerts to predetermined individuals within an organization.

13. The knowledge switch of claim 1 comprising an inter-agency knowledge switch management template associated with the knowledge switch configurator, the inter-agency knowledge switch management template comprising an interface for configuring the logic kernel to distribute different information alerts to different groups of individuals.

14. The knowledge switch of claim 1 wherein the event information includes an event identifier for allowing a user to inform the logic kernel of the occurrence of the event.

15. The knowledge switch of claim 1 wherein the event information includes information generated by a machine in response to the occurrence of the event.

16. The knowledge switch of claim 1 wherein the knowledge switch configurator is adapted to allow the administrator to configure the logic kernel regarding input expected from the intended recipients in response to the directive.

17. The method of claim 1 wherein the event comprises an airport security event.

18. The knowledge switch of claim 1 wherein the schedule template is adapted to receive input from the user regarding time periods during which the user can receive the information alert using each of the contact profiles.

19. A hierarchical system of knowledge switches for delivering alerts to end users, the system comprising:
(a) a plurality of first knowledge switches located at predetermined points of presence for receiving security event information, for locating corresponding information alerts, and for distributing the information alerts over a computer network, wherein the information alerts each include a directive for instructing intended recipients on action to be taken in response to the corresponding security event; and
(b) a plurality of second knowledge switches located at predetermined agencies, the second knowledge switches being coupled to the first knowledge switches via the computer network, each second knowledge switch being configured to receive the information alerts, apply a policy level to the information alerts, and distribute the information alerts to selected end users associated with each second knowledge switch based on the policy level, wherein each of the first and second knowledge switches includes a contact list template for receiving input from a user for defining a plurality of different contact profiles of the user, each contact profile including at least one mode and contact information for delivering an information alert to the user in the at least one mode, and a schedule template for associating a plurality of different time periods with the different contact profiles, wherein each of the knowledge switches is adapted to deliver an information alert to its respective users using the contact profiles and times specified by the users.

20. The system of claim 19 wherein the first and second knowledge switches include knowledge switch configurators for defining information alerts and individuals for receiving the information alerts.

21. The system of claim 19 wherein the first and second knowledge switches are adapted to distribute the information alerts based on end user and agency certificate levels.

22. The system of claim 19 wherein the event information includes an event identifier for allowing a user to inform the first knowledge switches of the occurrence of the event.

23. The system of claim 19 wherein the event information includes information generated by a machine in response to the occurrence of the event.

24. The system of claim 19 wherein the second knowledge switches are configured to expect predetermined input from the intended recipients in response to the directives.

25. The system of claim 19 wherein the event comprises an airport security event.

26. The system of claim 19 wherein the schedule template is adapted to receive input from the user regarding time periods during which the user can receive the information alert using each of the contact profiles.

27. A method for defining and distributing information alerts, the method comprising:
(a) presenting a user with a plurality of templates for configuring a knowledge switch to identify event information regarding a security event, to provide an information alert including user-defined content, and to automatically distribute the information alert to the intended recipients in response to receiving the event information, wherein presenting the user with a plurality of templates includes providing a contact list template to the user for receiving input from the user for defining a plurality of different contact profiles of the user, each contact profile including at least one mode and contact information for distributing an information alert to the user in the at least one mode, and providing a schedule template for associating different times with the contact profiles;
(b) receiving, via the templates, event definition information for defining the security event and receiving content for the information alert to be delivered to the intended recipients, wherein receiving content for the information alert includes receiving a directive instructing the intended recipients on how to respond to the security event;
(c) receiving, via the contact list and schedule templates, a plurality of different information alert delivery modes and corresponding times for each of the intended recipients; and
(d) automatically distributing the information alert to the intended recipients using the information provided via the templates, wherein automatically distributing the information alert to the intended recipients includes distributing the information alert to each recipient using at least one of the plurality of contact profiles and times defined for each recipient.

28. The method of claim 27 wherein presenting the user with a plurality of templates includes presenting the user with a plurality of templates via a computer network interface.

29. The method of claim 27 wherein receiving event definition information and content includes receiving access information, user information, and triggered alert information via an event template.

30. The method of claim 29 wherein the access information includes spoken commands for communicating an event to a knowledge switch via a mobile or landline telephone, the user information includes the directive, and the triggered alerts information includes an alert message to be included in the information alert.

31. The method of claim 29 wherein the contact list template includes user-editable fields for specifying contact information for the at least one contact mode for each contact profile and wherein the schedule template includes a user-editable calendar for associating times of day with each contact profile.

32. The method of claim 27 wherein distributing the information alert to the intended recipients using the information provided by via templates includes, for each recipient, accessing contact and schedule information stored for each recipient, converting the information alert to the appropriate format based on the contact and schedule information, and delivering the information alert via a medium specified by the contact and schedule information.

33. The method of claim 27 wherein distributing the information alert to the intended recipients includes delivering the information alert via a telephone network to all recipients in a geographic area.

34. The method of claim 27 wherein distributing the information alert to the intended recipients includes parsing the information alert based on recipient certificate levels and selectively delivering portions of the information alert to the intended recipients based on individual end user certificate levels.

35. The method of claim 27 comprising, determining whether receipt confirmation is required from each recipient and, in response to determining that receipt confirmation is required, resending the information alert if receipt confirmation is not received within a predetermined time period.

36. The method of claim 27 comprising, determining whether a response is required from each recipient, and, in response to determining that the response is required, resending the information alert if the response is not received within a predetermined time period.

37. The method of claim 27 comprising including an authentication portion in the information alert for allowing the intended recipients to authenticate the information alert.

38. The method of claim 27 comprising receiving input from the intended recipients for storing the information alert in a predetermined format, and, in response, storing the information alert for later access by the intended recipients.

39. The method of claim 27 wherein the event information includes an event identifier for allowing a user to communicate the occurrence of the event to a knowledge switch.

40. The method of claim 27 wherein the event information includes information generated by a machine in response to the occurrence of the event.

41. The method of claim 27 comprising configuring a knowledge switch to expect predetermined input from the intended recipients in response to the directive.

42. The method of claim 27 wherein the event comprises an airport security event.

43. The method of claim 27 wherein the schedule template is adapted to receive input from the user regarding time periods during which the user can receive the information alert using each of the contact profiles.

* * * * *